United States Patent [19]

Linder et al.

[11] Patent Number: 4,778,596
[45] Date of Patent: Oct. 18, 1988

[54] SEMIPERMEABLE ENCAPSULATED MEMBRANES, PROCESS FOR THEIR MANUFACTURE AND THEIR USE

[75] Inventors: Charles Linder, Rehovot; Gershon Aviv, Tel Aviv; Mordechai Perry, Petach Tikvah; Reuven Kotraro, Rehovot, all of Israel

[73] Assignee: Aligena AG, Basel, Switzerland

[21] Appl. No.: 876,130

[22] Filed: Aug. 18, 1986

Related U.S. Application Data

[63] Continuation of Ser. No. 558,169, Dec. 5, 1983, abandoned.

[30] Foreign Application Priority Data

Dec. 27, 1982 [CH] Switzerland ..................... 7572/82

[51] Int. Cl.$^4$ ............................................. B01D 13/00
[52] U.S. Cl. ..................... 210/638; 210/651; 210/654; 210/490; 210/500.38
[58] Field of Search .............. 210/490, 500.38, 500.43, 210/638, 654, 651, 652

[56] References Cited

U.S. PATENT DOCUMENTS

| | | | |
|---|---|---|---|
| 4,337,154 | 6/1982 | Fukuchi et al. ..................... 210/490 |
| 4,431,545 | 2/1984 | Pall et al. ................... 210/500.38 X |
| 4,473,475 | 9/1984 | Barnes, Jr. et al. ................. 210/638 |
| 4,477,634 | 10/1984 | Linder et al. ............. 210/500.43 X |
| 4,604,204 | 8/1986 | Linder et al. ........................ 210/490 |

FOREIGN PATENT DOCUMENTS

| 8945 | 3/1980 | European Pat. Off. . |
|---|---|---|
| 2822784 | 11/1978 | Fed. Rep. of Germany . |
| 3013171 | 10/1980 | Fed. Rep. of Germany . |

*Primary Examiner*—Frank Spear
*Attorney, Agent, or Firm*—Wenderoth, Lind & Ponack

[57] ABSTRACT

Semipermeable membranes of a porous polymeric substrate whose external and all internal surfaces (pores) are encapsulated by a semipermeable thin film of a hydrophilic polymer are provided. The encapsulating film consists of at least one layer of said polymer which is cross-linked/stabilized by polyfunctional compounds containing at least two functional (reactive) groups. The membrane substrate is optionally pretreated—before the encapsulation step—with polyfunctional compounds. The new membranes can be used in ultrafiltration and reverse osmosis processes. They are solvent-, pressure- and temperature-resistant and show good separation capacities, e.g. for separating organic compounds from salt solutions.

35 Claims, No Drawings

SEMIPERMEABLE ENCAPSULATED MEMBRANES, PROCESS FOR THEIR MANUFACTURE AND THEIR USE

This is a continuation of application Ser. No. 558,169, filed Dec. 5, 1983, now abandoned.

The present invention relates to encapsulated membranes composed of a thin cross-linked hydrophilic semipermeable film, coated onto the external and accessible internal surfaces (i.e. pores) of a thicker, more porous semipermeable membrane substrate. The coated film is cross-linked/stabilized by polyfunctional compounds containing at least two functional groups.

Though both the components of the membrane (the thin film coating and the thicker membrane substrate) comprise the invention, the film layer may be thought of as improving the rejection of the membrane substrate to solutes and increasing the efficiency of separating, preferably when separating low molecular weight monovalent salts from multivalent or higher molecular weight solutes.

The inventive membranes are formed by a "build-up" of a bonded hydrophilic polymer or poly-electrolyte on the membrane substrates' surface and/or pores, and may be thought of (without limiting the invention) as a modification of the said membrane substrate by adsorptive forces (physical or electrostatic adsorption of a polymer on the substrate), followed by stabilising the polymeric film through cross-linking. The inventive membranes can be used as reverse osmosis (RO) or ultrafiltration (UF) membranes.

Thin film composites have been described for reverse osmosis (RO) membranes. In effect, microporous or ultrafiltration (UF) substrates are coated essentially only on the surface with hydrophilic polymers and cross-linked on the external surface, and not within the pores with hydrophobic crosslinking agents for salt rejecting (RO) membranes (EP No. 8945, U.S. Pat. No. 3,951,815, GB No. 1,558,807, GB No. 2,027,614, U.S. Pat. No. 4,039,440). A cardinal principle of this approach is that during fabrication both the cross-linking agent and its solvent are water-insoluble and do not dissolve the thin layer, and that the cross-linking reaction is essentially interfacial or occurs within the top layers only. The said layer may vary in thickness between 200 to 50,000, preferably 200 to 5000 Å, or between 1000 to 5000 Å. The adsorption of the thin layer to the membrane substrate relies on physical or mechanical attachment (such as partial penetration into the pores of the substrate). Thus, peeling or detachment is possible and is known to occur. In addition, the substrate systems are generally made of polymers (polysulfones, polyvinylidene fluorides, and polycarbonates) which are solvent sensitive and may dissolve in non-aqueous solvents.

It is further known from the state of the art (EP No. 25973, EP No. 26399) to prepare membranes which comprise a thin cross-linked hydrophilic semipermeable film chemically bonded to a thicker more porous membrane. These membranes require reactive groups on the membrane to chemically bond the thin film to the said membrane and cross-link the membrane (e.g. with a reactive dyestuff). Without this chemical bonding the coated polymers cross-linked with reactive dye have insufficient life time, especially at pH and temperature extremes, and are soluble in various organic solvents such as N-methylpyrrolidon (NMP), dimethylformamide (DMF) or dimethylsulfoxide (DMSO).

One approach of coating a UF membrane with hydrophilic polymers for improving rejection is described in U.S. Pat. No. 4,125,462. The coating polymers are water soluble amines that are physically adsorbed, and there is no attempt to cross-link or bind the coated layers.

Composite membranes containing non-cross-linked polymer coatings show a decline in rejection with time because the unreacted layer is instable and slowly washed away.

The main object of the present invention is, therefore, to provide improved semipermeable membranes of good chemical and mechanical stabilities in order to overcome the disadvantages of the known membranes.

It is now found that these disadvantages can be overcome by new so-called encapsulated membranes which comprise a polymer-coating stabilized with a polyfunctional agent to the extent that chemical bonding to the substrate is not necessary. In addition, the polyfunctional compound cross-links not only the external polymer film or the film on the surface of the membrane, but, because of its diffusion throughout the membrane, it also cross-links the coating within the pores. The result is the so-called encapsulated membrane.

Through this kind of coating and subsequent cross-linking (e.g. with non-ionic, positively or negatively charged polyfunctional compounds), membranes are obtainable with a significant improvement in membrane rejection and flux, this latter showing only a minimal decline with time.

The apparent reason is that a minimum thickness is needed to achieve suitable rejection, and this quantity is fixed by cross-linking, while the unreacted layer is slowly washed away. In addition, when two types of cross-linking agents are used for the hydrophilic polymer, e.g. ionic and non-ionic ones, the resultant membranes show improved separation behaviour as well as enhanced life times at high pH, temperature and pressure.

Therefore, it is one object of the present invention to provide new semipermeable encapsulated membranes composed of a semipermeable membrane substrate and a thin semipermeable film wherein the film is coated onto (encapsulating) the external and accessible internal surfaces of the substrate and comprises at least one layer of a cross-linkable hydrophilic polymer which is cross-linked with a polyfunctional compound containing at least two functional groups, and wherein said substrate is optionally pretreated with a polyfunctional compound containing at least two functional groups.

Thus the requirements for achieving the membrane of this invention are a polymer coating on both the internal (pores) and external surfaces of the membranes, and secondly a cross-linking agent that can diffuse within a relatively short time (e.g. 1 sec. to 60 min.) throughout the membrane and within the bulk of the coating. The said starting membrane (membrane substrate) must have a sufficient internal surface area, and should be sufficiently porous to allow penetration of a given coating polymer. The polyfunctional cross-linking agent must be permeable through the bulk of the coating polymer to achieve a stable cross-linking.

The advantages of the inventive membranes over those of the state of the art lie in a simple modification procedure, wherein the basic membranes (forming the substrate) need not contain functional groups; the procedure is applicable to many different membranes; further these membranes show good stabilities, flux and rejection.

The modification procedure does not require a drying/curing step or a restraining structure to prevent skrinkage. The inventive membranes may be stored dry.

The present invention describes UF/RO membranes and their preparation, wherein the shortcomings of composite membranes, such as detachment of layers and solvent sensitivity are minimized. In addition, the coated cross-linked layer is carried throughout all the accessible internal and external surfaces and the final cross-linking step is carried out preferably in a hydrophilic solvent (e.g. water) or in solvent mixtures such as aqueous solutions of acetone, DMF or NMP with water soluble polyfunctional reagents. The final membrane is useful in ultrafiltration and reverse osmosis and especially for applications in the range of pressures (5 to 50 bar) and cut-offs (100 to 2000 MW) associated with membranes between RO and UF, with average pore sizes of between 5 to 500 Å, preferably 10 to 100 Å.

Other objects of the present invention are processes for the manufacture of the inventive membranes (membrane films of cross-linked polymers on and inside the pores of porous substrates), as well as the use of these membranes in ultrafiltration and reverse osmisis processes, viz. in fields involving concentration and purification of liquids, e.g. separating salts from organic compounds or purifying waste water.

These and other objects of the present invention will become apparent from the following detailed description.

The inventive membranes comprise, e.g. such which are obtainable through coating onto the external and all accessible internal surfaces of the porous substrate, at least one layer of a cross-linkable hydrophilic polymer, the substrate being optionally pretreated with a polyfunctional compound containing at least two functional groups, and the layer being cross-linked with a polyfunctional compound containing at least two functional groups.

Preferred membranes with at least one layer of a hydrophilic polymer are obtainable by ($a_1$) depositing at least one layer of a cross-linkable, hydrophilic non-ionic polymer onto the substrate and cross-linking said layer with at least one, preferably two polyfunctional compound(s) containing at least two functional groups, at least one of the polyfunctional compounds containing ionic groups, or ($a_2$) depositing at least one layer of a cross-linkable, hydrophilic, polymer containing ionic groups onto the substrate and cross-linking said layer with at least one polyfunctional compound containing at least two functional groups, or ($a_3$) treating the membrane substrate with a polyfunctional compound containing at least two functional groups, depositing at least one layer of a cross-linkable, hydrophilic polymer onto the substrate and cross-linking it with at least two polyfunctional compounds containing each at least two functional groups.

Membranes ($a_1$) can be prepared by using combinations of polyfunctional compounds which comprise non-ionic and ionic (anionic or cationic) or ionic (anionic/anionic; cationic/cationic or with opposite charges: anionic/cationic) species; optionally the ionic polyfunctional compounds can be combined with non-ionic polyfunctional compounds. These compounds can be used in either order.

Membranes ($a_2$) which are prepared by using hydrophilic polymers containing ionic groups can be cross-linked and stabilized by non-ionic and/or ionic (anionic or cationic) polyfunctional compounds. The cross-linking can be carried out with one or several polyfunctional compounds (e.g. several non-ionics) or with combinations of, e.g. non-charged and charged compounds (e.g. non-ionic together with anionic compounds).

In a further preferred embodiment of the present invention ionic polyfunctional compounds are used whose charges are opposite to those of the polymer.

When the hydrophilic film-forming polymer is an amphoteric one (containing positively and negatively charged groups), then cross-linking is carried out preferably with anionic and mostly preferred with non-ionic polyfunctional compounds containing at least two functional groups. In this case they serve first of all for cross-linking but not for the introduction of further charges.

Membranes ($a_3$) are obtainable by pretreating the membrane substrate with polyfunctional compounds containing at least two functional groups, depositing the polymer onto the substrate and cross-linking the polymer; the first adsorbed polyfunctional compound may cross-link the hydrophilic coating by diffusion from the initial surface into the bulk of the coating.

The polyfunctional compounds (used in the so-called pretreatment as well as for cross-linking) can be ionic or non-ionic monomeric or polymeric species. These compounds can be used singly or as combinations of several compounds having no charged groups (non-ionics), the same or opposite charges or a mixture thereof (e.g. non-ionics combined with ionics, such as anionics). These cross-linking agents can diffuse into the polymer layer and cross-link it. The use of at least two cross-linking agents is preferred.

The inventive membranes ($a_1$) to ($a_3$) comprise at least one polymer layer, while the polyfunctional compounds preferably are bi- to tetrafunctional, and especially bi- or trifunctional.

When there is more than one polymer layer in the thin semipermeable membrane film, then there are as a rule two or three layers, each of which is cross-linked. The polyfunctional cross-linking agents may be non-ionics or ionics; a single agent can be used, or mixtures of crosslinking agents like mixtures of non-ionic, anionic or cationic species which can be combined too (combination of differently charged cross-linkers or of ionics and non-ionics e.g. non-ionics/anionic or cationic/anionic species).

The polymers for the manufacture of the membrane film may contain anionic or cationic groups or both (amphoteric polymer), such as polyamido-polyamine-epichlorohydrin resins. Preferred are, however, non-ionic polymers such as polyethyleneimine (PEI) or polyvinyl alcohol (PVA).

The inventive membranes can be obtained by using, e.g. the following modification sequences:

M=basic membrane (substrate) (e.g. of polyacrylonitrile, polysulfone etc.)

P=coating polymers for preparing the semipermeable layer that encapsulates M (e.g. polyethyleneimine)

P*=P with ionic groups (e.g. anionic or anionic and cationic groups)

J=ionic polyfunctional compound containing at least two functional groups

N=non-ionic polyfunctional compound containing at least two functional groups (J and N are used in chemical cross-linking reactions).

I. Membrane first coated externally and internally with a coating polymer (P):

```
M — P — J — N
M — P — N — J
M — P — N — P — J — N
M — P — J — P — J
M — P — N — P — N
M — P — J — N — P — J — N
M — P — J — N — P — J
M — P* — N
M — P* — N — P* — N
```

II. Membrane first impregnated with ionic polyfunctional compound (J):

```
M — J — P — J
M — J — P — N
M — J — P — J — N
M — J — P — J — N — P — J
M — J — P — J — N — P — J — N
M — J — P — N — P — J — N
```

III. Membrane first impregnated with non-ionic polyfunctional compound (N):

```
M — N — P — J
M — N — P — N
M — N — P — J — N
M — N — P — J — N — P — J
M — N — P — J — N — P — J — N
M — N — P — N — P — J — N
```

This invention may be used to modify ordinary RO, UF or micro porous membranes (basic membranes or membrane substrates) with average pore sizes varying from 10 to 5000 Å. The preferred range, however, is 10–1000 Å and most preferred 20°–200 Å for the achievement of optimum rejection with flux. Efficient encapsulation of the membrane requires a minimum wettable internal surface area, which may be characterised as a void volume (porosity). This void volume may be at least 5%, and at most 90% of the volume of the total membrane. Preferred percentages are 10 to 80 or more preferred 20 to 75.

Any of the known membrane (substrate) forming materials may be used, as for example, organic polymers such as polyacrylonitriles and their copolymers (copolymer includes ter- and tetrapolymers), polyamides, polyvinyl chlorides and its copolymers, cellulosics, epoxy resins, polyaryleneoxides, polycarbonates, homo- and copolymers on the basis of heterocyclic compounds, polyvinylidene fluorides, polytetrafluoroethylenes, polyesters, polyimides, (aromatic) polysulfones, polyelectrolyte complexes, or polyolefins; they all may be used per se or as mixtures. Preferred polymers are such that consist of or contain cellulosics, (cellulose acetates), polyacrylonitriles. aromatic polysulfones, polyamides, polyvinylidene fluorides or polytetrafluoroethylenes.

Membrane casting may be performed by any number of casting procedures cited in the literature (for example U.S. Pat. No. 4,029,582, GB No. 2,000,720, U.S. Pat. Nos. 3,556,305; 3,615,024; 3,567,810). Thus, the polymer or its derivatives, may be dissolved in a suitable solvent or mixture of solvents (for example NMP, DMF, dimethylsulfoxide, hexamethylphosphoramide, N,N-dimethylacetatamide, dioxane), which may or may not contain cosolvents, partial solvents, non-solvents, salts, surfactants or electrolytes, for altering or modifying the membrane morphology and its flux and rejection properties (i.e. acetone, ethanol, methanol, formamide, water, methylethyl ketone, triethyl phosphate, $H_2SO_4$, partial esters of fatty acids and sugar alcohols or their ethylene oxide adducts, sodium dodecyl sulfate (SDS), sodium dodecylbenzene sulfonate, sodium hydroxide, potassium chloride, zinc chloride, calcium chloride, lithium nitrate, lithium chloride, or magnesium perchlorate).

The casting solution may be filtered by any of the known processes (i.e. pressure filtration through microporous filters or by centrifugation), and cast on a support such as glass, metal, paper or plastic from which it may then be removed. It is preferred, however, to cast on a porous support material from which the membrane is not removed. Such porous supports may be nonwoven or woven cloths such as of cellulosics, polyethylenes, polypropylenes, polyamides (nylon), polyvinyl chlorides and their copolymers, polystyrenes and polyethylene terephthalates (polyesters), polyvinylidene fluorides, polytetrafluoro ethylenes or glass fibers. The membrane may alternatively be formed as a hollow fiber or tubelet, not requiring a support for practical use.

The concentration of polymer in the casting solution may vary as a function of its molecular weight and additives between 5 to 80%, but preferably between 10 and 50% and most preferred between 15 to 30%. The temperature of casting may vary from −20° to 100° C., but the preferred range is between 0° to 60° C., varying as a function of the polymer, its molecular weight, and the cosolvents and additives, in the casting solution.

The polymer casting solution may be applied to the above mentioned supports by any of the well known techniques, known to those practiced in the art. The wet film thickness may vary between 5 μm to 2000 um. The preferred range is 50 μm to 800 μm and the most preferred 100 to 500 μm. The wet film and support may then be immersed immediately, or after a partial evaporation step (from 5 sec. to 48 hours) at ambient condition or elevated temperature, or vaccum or any combination thereof, into a gelling bath of a non-solvent. Such baths are usually water, or water with a small percent of a solvent (ex. DMF, NMP) and/or surfactant (ex. sodium dodecyl sulfate) at a temperature of 0° to 70° C. An example of a commonly used gelling bath is water with 0.5% SDS at 4° C. In another mode of forming membranes, a polymer solution containing a component that may be leached out in water or another solvent, is cast and dried before immersion. After immersion, leachable material is removed, resulting in a porous membrane.

In a third variation, a polymer solution without any leachable materials is cast and taken to dryness, resulting in a porous membrane by virtue of the physicochemical properties of the polymeric material-solvent combination, or by a subsequent chemical reaction that creates pores. All the above methods may be used to form membranes for further modification (coating) as described by the present invention.

The process for the manufacture of the inventive semipermeable membranes comprises depositing onto a semipermeable membrane substrate from an aqueous system at least one layer of a cross-linkable, hydrophilic polymer, the substrate being optionally pretreated with a polyfunctional compound containing at least two functional group, and cross-linking the layer by penetrating it with an aqueous preparation of at least one polyfunctional compound containing at least two functional groups.

Hydrophilic polymers are used to encapsulate the semipermeable membrane substrate. The preferred polymers are polyfunctional oligomers or polymers which active hydrogen atoms bonded to nitrogen, oxygen or sulfur atoms. The nitrogen atoms may be present as aliphatic (acyclic or cyclic), aromatic, or heterocyclic amino groups, which can be primary, secondary or tertiary. Or alternatively, but less preferred, they may be polymers of hydroxyl or thio-functions. Examples of such a polymers are polyethyleneimines (M.W. 150–2000,000), which can be partially alkylated or otherwise modified, polyvinylamine (M.W. 1000 to 2,000,000), polyvinyl alcohols (M.W. of 2,000 to 200,000) or partially esterified polyvinyl alcohols, polyvinylanilines, polybenzylamines, polyvinylmercaptans, polymers of 2-hydroxyethyl or 2-aminoethylmethacrylates, polyamino(methylamino)styrene-type polymers (EP No. 56175), polyvinylimidazolines, (poly)amine modified polyepihalohydrins and poly(2-chloroethylvinylethers) (described in GB No. 1,558,807, EP No. 56175), polydiallylamine derivatives (EP No. 56175), polymers containing piperidine rings (described in GB No. 2,027,614, EP No. 56175), amino polysulfones, amino polyarylene oxides (ex. amino methylated polyphenylene oxide), polyamido-polyamine-epichlorohydrin condensation products, polyglycidyl(meth)acrylates (EP No. 56175), and hydrophilic amines containing polymers described in EP No. 8945, and the condensation products of dicyandiamide, amine salts (ammonium chloride) and formaldehyde (U.S. Pat. No. 3,290,310). The above polymers may be in part a copolymer or a polymer containing other monomeric units, block polymers or graft polymers. If they are copolymers the other monomeric units may or may not contain ionic groups ($-SO_3^\ominus$, $-COO^\ominus$, $-N^\oplus R_3$).

Examples are copolymers of styrenesulfonate (sodium salt)/vinylaniline, 2-aminoethylmethacrylate/acrylic acid, vinylaniline/vinylbenzyl-trimethylammoniumchloride or vinylamine/vinylsulfonate.

Preferred polymers are polyvinylalcohols, cellulose derivatives, polyvinylamines, polyvinylanilines, polypiperidines, polydiallylamine derivatives or amine modified polymers on the basis of epoxides or epihalogenhydrins, as well as the copolymers exemplified above.

One especially preferred polymer comprises poly-aliphatic (acyclic or cyclic) amines. Polyethyleneimine is an example of this group. The range of molecular weights may be between 150 to 2,000,000, but preferably between 1000 and 200,000 and most preferred between 10,000 and 70,000. Low molecular weight polymers or oligomers (150 to 1000) may be used, but the increase in solute rejection of the final membrane is not as great when higher molecular weight polymers are used.

In another preferred case, water soluble amphoteric or block mosaic polymers containing both cationic and anionic groups, together with a reactive function (for example, $-NH_2$ or $-OH$ groups) for reaction with the polyfunctional cross-linking agents, are useful for forming a mixed charge membrane. These membranes are particularly useful for separating salt from relatively low molecular weight organic solutes. An example of such a coating polymer is poly(vinylamine-vinylsulfonate) or partially quaternized derivatives.

Water is the preferred solvent for the aforementioned molecules, though other solvents such as low molecular weight alcohols or ketones may be used alone or in combination with water. The range of polymer concentration may be from 0.1 to 80%, but preferably between 1 and 30%, and most preferred between 1.0 and 15%. Liquid polymers can be used without solvents, that is as pure (100%) agents.

The concentration of polymer needed to achieve optimum rejection and flux characteristics is a function of polymer molecular weight and molecular dimensions, membrane porosity and pore size, temperature, time of immersion, pH and subsequent washing steps. These factors (together with a rinse step after immersion) control the thickness of the polymer layer deposited on the membrane. The temperature of the polymer solution during membrane immersion may vary from 0° to 90° C. The optimum temperature is a function of adsorption rates. The time of immersion may vary between 1 minute to 48 hours as a function of the temperature, pH, concentration, and the molecular weight dimensions and solution properties of the coating polymer.

The pH may be used to control reactivity and conformation of the coating (encapsulating) polymer. This will effect the flux/rejection properties of a given application.

The pH of the polymer solution may further be adjusted to control the solubility of the polymer and the quantity of polymer adsorbed to the surface. Thus, for polyamines (PEI), a pH above 7.0 increases nucleophilic reaction rates, and for membrane modification a pH range of 7.0 to 10.0 was found to be optimum in most cases, though higher or lower pH's could also be used. If more acidic pH's are used to improve the solubility of the coating polymer, a given time is allowed for adsorption of the polymer to the membrane; afterwards the pH may be adjusted to optimize the reaction.

After immersion the coated membrane is rinsed in water to remove excess polymer. This step is a function of the coating polymers solution adsorption properties and concentration in solution and membrane porosity. The time of rising may vary from one minute to 48 hours, but most preferably from 30 minutes to 4 hours for a 10% PEI solution used for 5 minutes. Excessive washing or rinsing results in membranes with lower than maximum rejection, but still higher than the unmodified membrane. Shorter rinsing times leave a relatively thick deposit of polymer and result in relatively low fluxes. The pH and temperature of the rinsing solution may vary between 1.0 and 12, and 0° to 100° C., respectively. Lower concentrations of PEI allow shorter rinsing times or only a draining step.

The rinsing solutions may contain usual additives such as non-ionic or anionic detergents and/or salts (sodium carbonate, sodium sulfate) in order to reduce the rinsing time.

After the adsorption of the polymers or after the washing or draining step, too, the polymer layer can be subjected to a heat treatment, e.g. at temperatures of from 40° to 130° C. at 5 to 30 minutes in order to improve e.g. its thickness, density, uniformity and even its chemical reactivity (in the subsequent crosslinking step).

The polyfunctional compounds containing at least two functional groups may be ionic or non-ionic ones.

They may be of low molecular weight or polymers. Their functional (reactive) groups may be the same. They possess cross-linking properties and bond with the coating polymer. These compounds, which have at least two functional groups, possess their reactivity by virtue of reactive multiple bonds, epoxide groups, aziridine groups, aldehyde groups, imidate groups or isocyanate or isothiocyanate groups, further hydroxyl, carboxylic acid anhydride, acyl halide, carbonic acid imide halide or N-methylol groups, (these bonds or groups may be further substituted), or of substituents detachable as tertiary amines or preferably as anions, and combinations of these are also possible. The compounds contain, for example, the groupings

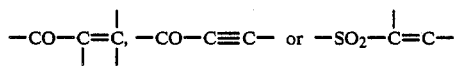

as a multiple bond to which further substituents can be added on. The isocyanate or isothiocyanate group can also be considered as a group of this type. The polyfunctional compounds can contain quaternary ammonium groups, which are split off as tertiary amines, for example, a trimethylammonium or pyridinium group of sulfonium groups, as the leaving groups. However, they preferably contain substituents with groups that split off as an anion, and preferably containing a reactive halogen atom, as the reactive group. These leaving groups possess their reactivity by virtue of, for example, the influence of electrophilic groups, such as the —CO— or —SO$_2$— group in saturated aliphatic radicals. They also possess their reactivity by virtue of the influence of a quaternary nitrogen atom, such as in the group $\geq$NCH$_2$CH$_2$Cl, or in aromatic radicals by virtue of the influence of electrophilic groups in the o- and p-position, for example, nitro, hydrocarbonsulfonyl or hydrocarboncarbonyl groups, or of the bond to a ring carbon atom, which is adjacent to a tertiary ring nitrogen atom, as in halogenotriazine or halogenopyrimidine radicals.

Non-ionic polyfunctional compounds which have proven particularly advantageous are cyclic carbonic acid imide-halides, and in particular halogeno-diazines or -triazines containing at least two reactive substituents, as well as compounds containing isocyanate or isothiocyanate or N-methylol groups. Tetrachloropyrimidine, and in particular cyanuric chloride have proven particularly advantageous. Further preferred compounds are diepoxides, aziridines, acid anhydrides, dihalogenides of dicarboxylic acids and dialdehydes.

The cyclic carbon acid imide-halides used are advantageously:

(A) s-Triazines containing at least two identical or different halogen atoms bonded to carbon atoms, for example, cyanuric chloride, cyanuric fluoride, cyanuric bromide and also primary condensation products of cyanuric fluoride, cyanuric chloride or cyanuric bromide and, for example, water, ammonia, amines (alkylamines), anilines, alkanols, alkylmercaptans, phenols or thiophenols;

(B) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example, chlorine, bromine or fluorine. Particularly suitable halogenopyrimidines are 2,4,6-trichloro- and 2,4,5,6-tetrachloro-pyrimidines; derivatives of pyrimidine similar to those of (A) above;

(C) Halogenopyrimidinecarboxylic acid halides, for example, dichloropyrimidine-5- or 6-carboxylic acid chloride;

(D) 2,3-Dihalogeno-quinoxaline-, -quinazoline- or -phthalazine-carboxylic acid halides or -sulfonic acid halides, such as 2,3-dichloroquinoxaline-6-carboxylic acid chloride or acid bromide;

(E) 2-Halogeno-benzthiazole- or -benzoxazole-carboxylic acid halides or -sulfonic acid halides, such as 2-chloro-benzthiazole- or -benzoxazole-5- or 6-carboxylic acid chloride or -5- or -1-6-sulfonic acid chloride; and (F) Halogeno-6-pyridazonyl-1-alkanoyl halides or -benzoyl halides, for example, 4,5-dichloro-6-pyridazonyl-1-propionyl chloride or -1-benzoyl chloride.

Further compounds which contain at least two reactive substituents and can be employed are, for example:

(G) Anhydrides or halides of aliphatic, $\alpha,\beta$-unsaturated mono- or di-carboxylic acids having preferably 3 to 5 carbon atoms, such as maleic anhydride, acryloyl chloride, methacryloyl chloride and propionyl chloride;

(H) Dicarboxylic acids or their esters, carboxylic acid anhydrides or halides of aliphatic mono- or di-carboxylic acids having preferably 3 to 10 carbon atoms, or of aromatic carboxylic acids, containing reactive halogen atoms, for example, chloroacetyl chloride, $\beta$-chloropropionyl chloride, $\alpha,\beta$-dibromopropionyl chloride, $\alpha$-chloro- or $\beta$-chloro-acryloyl chloride, chloromaleic anhydride and $\beta$-chloro-crotonoyl chloride, and fluoronitro- or chloro-nitro-benzoic acid halides or -sulfonic acid halides in which the fluorine atom or the chlorine atom is in the o-position and/or p-position relative to the nitro group, esters of unsaturated acids and polyalcohols, such as (poly)ethyleneglycoldi(meth)acrylates.

(I) Carboxylic acid N-methylolamides or reactive functional derivatives of these methylol compounds. Carboxylic acid N-methylolamides are in particular N-methylol-chloroacetamide, N-methylol-bromoacetamide, N-methylol-$\alpha,\beta$-dichloro- or -dibromo-propionamide, N-methylol-acrylamide and N-methylol-$\alpha$-chloro- or -$\alpha$-bromoacrylamide. Reactive derivatives of the carboxylic acid N-methylolamides, are for example, the corresponding N-chloromethyl- or N-bromomethyl-amides;

(J) Free or etherified N-methylolureas or N-methylolmelamines, for example, N,N-dimethylolurea, N,N-dimethylolurea dimethyl ether, N,N'-dimethylolethylene- or -propylene-urea, 4,5-dihydroxy-N,N'-dimethylolethyleneurea or 4,5-dihydroxy-N,N'-dimethylolethyleneurea dimethyl ether, di- to hexamethylolmelamine trimethylolmelamine dimethyl ether, pentamethylolmelamine di- or -trimethyl ether and hexamethylolmelamine pentamethyl or hexamethyl ether;

(K) Condensation products of dialkylalkanes containing at least one phenolic hydroxyl group and halogenohydrins, for example, the diepoxide obtained from 2,2-bis-(4'-hydroxyphenyl)-propane and epichlorohydrin, as well as glycerol triglycidyl ethers and also corresponding diaziridines;

More particularly the following (poly)epoxides can be mentioned:
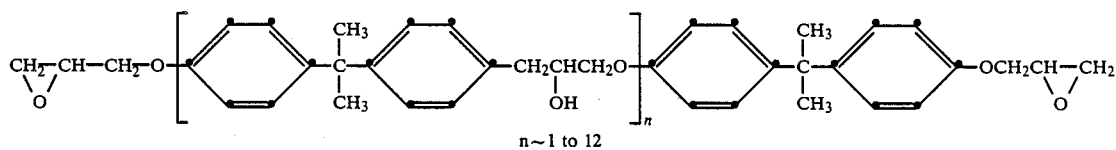
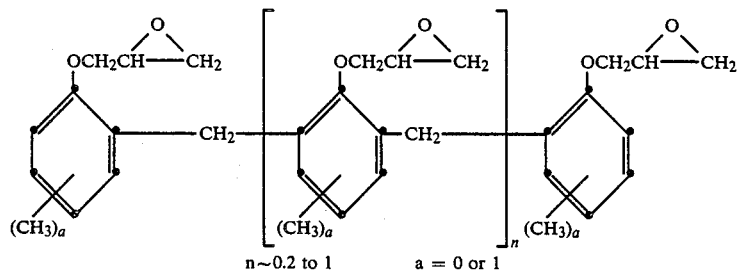
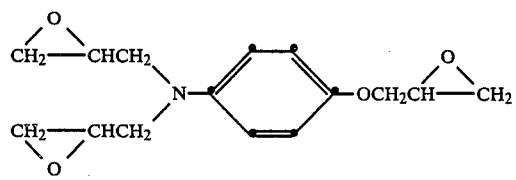
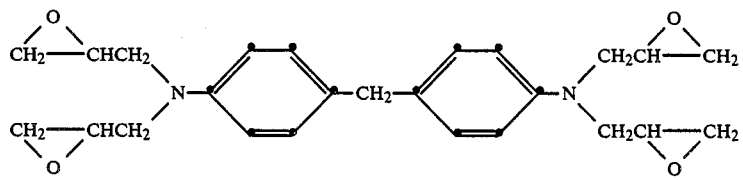
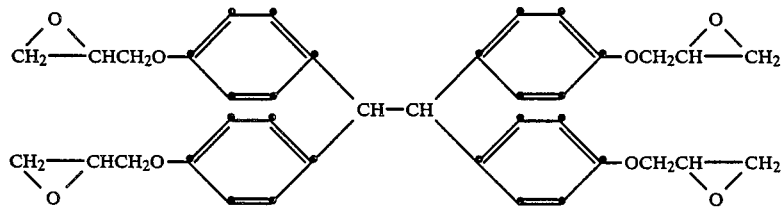
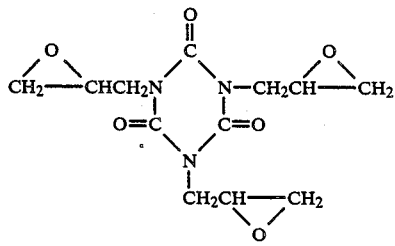
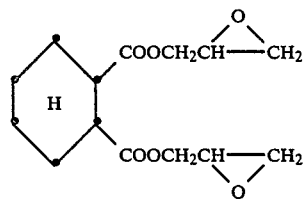
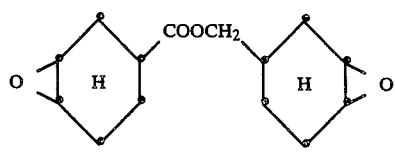
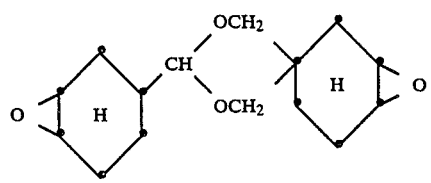
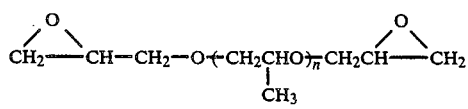

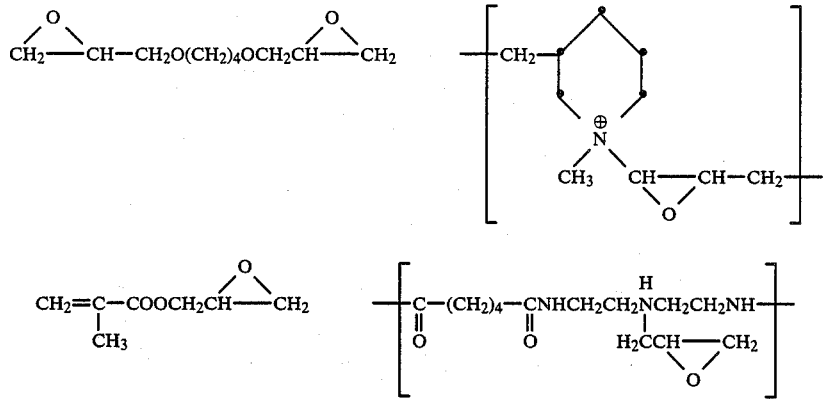

(L) Di-aldehydes, for example, glutaraldehyde or adipaldehyde;

(M) Diisocyanates or diisothiocyanates, such as alkylene ($C_2$–$C_4$)-diisocyanate, e.g. ethylene diisocyanate, phenylene- or alkyl($C_1$–$C_4$)-substituted phenylenediisocyanates, e.g. phenylene-1,4-diisocyanate or toluene-1,4-diisocyanate, or phenylene-diisothiocyanates, for example, phenylene-1,4-diisothiocyanate; or (N) Further reactive compounds, such as trisacryloyl-hexahydro-s-triazine, epoxides, vinyl compounds, aziridines, chlorohydrins, such as ethyleneglycoldichlorohydrin, glyceroldi(tri)chlorohydrin.

The preferred polyfunctional ionic crosslinking reagents are ionic or charged derivatives of triazinyl or pyrimidinyl compounds. Reactive azo dyes (containing sulfonic acid groups, carboxyl groups or ammonium groups) belong to this class as do non-colored compounds with the aforementioned functions.

The ionic reactive dyes which can be used belong to various categories, for example, anthraquinone, formazan or preferably azo dyes, which are optionally metal complexes. Suitable reactive groups (which are part of the dyes) are the following: carboxylic acid halide groups, sulfonic acid halide groups, radicals of $\alpha,\beta$-unsaturated carboxylic acids or amides, for example, of acrylic acid, methacrylic acid, $\alpha$-chloroacrylic acid, $\alpha$-bromoacrylic acid or acrylamide radicals of preferably low halogeno-alkylcarboxylic acids, for example, of chloroacetic acid, $\alpha,\beta$-dichloropropionic acid or $\alpha,\beta$-dibromopropionic acid; radicals or fluorocyclobutanecarboxylic acids, for example, of tri- or tetrafluorocyclobutane-carboxylic acid; radicals containing vinylacyl groups, for example, vinylsulfone groups or carboxyvinyl groups; radicals containing ethylsulfonyl (—$SO_2CH_2CH_2OSO_2OH$, —$SO_2CH_2CH_2Cl$) or ethylamino sulfonyl groups (—$SO_2NHCH_2CH_2OSO_2OH$) and halogenated heterocyclic radicals such as dihaloquinoxalines, dihalopyridazonyl, dihalophthalazines, halobenzothiazoles and preferably halogenated pyrimidines or 1,3,5-triazines such as monohalotriazines, dihalotriazines, 2,4-dihalopyrimidines or 2,4,6-trihalopyrimidines. Suitable halogen atoms are fluorine, bromine and especially chlorine atoms.

Ionisable groups, which the membrane-modifying substances can contain are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups.

Preferred reactive groups present in the ionic polyfunctional compounds are monochlorotriazinyl, dichlorotriazinyl, 2,4-dichloropyrimidinyl, 2,3-dichloroquinoxaline-6-carbonyl, 4,5-dichloropyridazonylpropionyl, 1,4-dichlorophthalazine-6-carbonyl, chlorobenzothiazole linked to the dye via —CONH—, —$SO_2NH$—, —NH—Ar—N=N— (Ar=phenylene or naphthylene), 5-chloro-4-methyl-2-methylsulfonylpyrimidinyl, vinylsulfonyl, $\beta$-sulfato ethylsulfonyl, $\beta$-sulfatoethyl aminosulfonyl, $\beta$-chloroethylsulfonyl or $\beta$-sulfatopropionamide.

Mostly preferred are reactive azo dyestuffs containing sulfonic acid (—$SO_3H$) or carboxyl (—COOH) groups (either group may be also present in salt form, such as alkali metal salt, e.g. sodium salt, and as reactive groups monochlorotriazinyl, dichlorotriazinyl, 2,4-dichloropyrimidinyl, vinylsulfonyl, $\beta$-sulfatoethylsulfonyl, $\beta$-chloroethylsulfonyl or $\beta$-sulfatoethylaminosulfonyl radicals.

Both di- and polyepoxides are also preferred. For example, butane-1,4-diglycidylethers (diepoxides), triepoxides such as, e.g. the condensation product of glycerol and epichlorohydrin, and polyepoxides, such as, e.g. polyamidopolyamine-epichlorohydrins can be used.

The inventive membranes, which contain at least at the membrane surface polymer modified by an azo dye containing sulfonic acid groups, are particularly valuable and versatile in use. The azo dye can also contain a metal, for example, copper, bonded as a complex.

Unlike the state of the art practiced in the manufacture of composite RO membranes, the crosslinking (and charging step) for both the nonionic and the ionic compounds is preferably carried out in an aqueous solution. Thus, water soluble or partially soluble multifunctional reagents are found to give good results.

An effective reagent may cross-link via chemical bonds, electrostatic interactions of ionic groups, and by chelation or coordination of polymeric functions with metal ions. The preferred mode of cross-linking is via a covalent bond, though the other two modes may also be used. In some cases all three modes of cross-linking may be operative via application of a single component (e.g. a reactive dye), or may be reached by sequential or parallel application of 2 or 3 different compounds (dyestuff and metal salt).

Multivalent metal salts that may find application in cross-linking said film via chelation or coordination bonds, are for example, $CuSO_4$, $CrCl_3$ and $FeCl_3$. These salts may be applied alone, in combination with each other, or in combination with covalent (ionic) binding compounds.

Most of the above mentioned (non-ionic and colourless polyfunctional reagents such as epoxides, aziridines, anhydrides, and preferably cyclic carbonic acid imide halides (cyanuric chloride or tetrachloropyrimidine), dihalides of dicarboxylic acides, dialdehydes or trihalides of tricarboxylic acids. While many can be applied in aqueous solutions within a range of pH and temperature, the acyl halides however must be dissolved in aprotic solvents.

The ionic or non-ionic polyfunctional compounds can be applied from 0.01 to 20 (0.1 to 20) % aqueous solutions (suspensions) to the coated polymer. Preferably these solutions contain 0.05 to 10% or 0.05 to 5 (0.5 to 5) % by weight of the cross-linking agents. About 0.05 to 25 miliequivalents/g of the cross-linking agent (polyfunctional compound) may be present (bonded to) the polymer film of the membrane.

The crosslinking of the polymer layer can be carried out at higher temperatures, e.g. in the range of from 40° to 130° C.

By way of an example for the reaction of polyethyleneimine coating (containing amino groups) when, e.g. cyanuric chloride is used, with an aqueous (aqueous-organic (acetone)) solution (suspension) of this reagent which (solution) can contain 0.5 to 5 parts of cyanuric chloride per part of membrane. The reaction temperature should be kept below 4° C., for example, at 0° C., in order to prevent hydrolysis of the (first chloroatom of) cyanuric chloride; the pH value range is approximately between 8 and 11 and the reaction time can be from 1 minute to 5 hours.

Non-ionic cross-linking agents are used as a rule together with ionic ones; these latter are preferably used first followed by the non-ionics. If there are already ionic groups present in the coating polymers (anionic groups or anionic and cationic groups such as in ampho-teric (polymers) the introduction of further charges into the surface of the membrane is not necessary; a cross-linking step with non-ionic cross-linking agents is sufficient, or alternatively ionic-crosslinking agent can also be used.

The ionic polyfunctional cross-linking agents serve to introduce positive or negative charged (ionic groupings) into the membrane surface and/or the pores and to crosslink the membrane, and is effected in one or two stages.

The one-stage process means that the compound carrying the charge and the so-called fixing agent (for example, alkali) are used in one bath.

The two-stage process comprises first the step involving the adsorption of the compound carrying the charge and then, in a separate reaction solution, the fixing step (chemical reaction between the polyfunctional compound and the coating polymer). The two-stage process is preferred since, on the one hand, the concentration of the polyfunctional compound in the adsorption solution can be kept lower and a solution of this type can optionally be used several times, and on the other hand, the total reaction time is shorter than in the case of the one-stage process.

In the two-stage process, the concentration of, e.g. a reactive dye in aqueous solution can be about 0.5 to 3%; the adsorption is carried out, for example, at temperatures of 20° to 35° C. over a period of 2 to 60 minutes; the pH value can be 4 to 8. Fixing can then be carried out in an aqueous solution, the pH of which has been adjusted to 9 to 12, and the reaction time can be about 30 minutes. The pH is adjusted to the desired value using any desired inorganic (e.g. sodium carbonate) or organic bases.

Depending on the intended application, the inventive membranes can be in various (flat or tubular) forms, for example, in the form of sheets, leaves, tubes or tubelets or in the form of a pocket, bag, cone or of hollow fibres. When subjected to severe pressure, the membrane can, of course be protected by non-woven supports, supports made of textile fibres or paper, wire screens or perforated plates and tubes (modules). Within the range indicated further above, the pore size can be varied by means of different temperatures and can likewise be suited to the particular application. Thus, for example, by subjecting the membranes to heat treatment (50° to 150° C.) before or after their chemical modification, it is possible to change the pore size and thus the flux and the rejection of the membranes.

Compared with known membranes the inventive membranes show the following advantages:

Improvement in the efficiency of the separation of charged from non-charged (low- or high-molecular weight) compounds.

Possibility for use at pH values of up to about 12, preferably of about 2 to 12, and temperatures of up to 80° C., preferably in a range between room temperature (15° to 25° C.) and 80° C.;

Improvement in solvent resistance to the extent that the membrane is no longer soluble in common solvents, e.g. N,N-dimethyl-formamide;

Improved resistance to high pressure (good mechanical stability). Pressures between about 2 and 100 bars, preferably 2 and 50 bars, and especially 2 and 30 bars.

The following applications in particular are advantageous for the membranes according to the invention and, in principle, these applications always concern the separation of monovalent ions of low ionic weight from polyvalent ions of low or relatively high ionic weight, or from monovalent ions of relatively high ionic weight, or the separation of ionic substances from non-ionic substances, or of ionic compounds of different molecular weights or of opposite charge. The separation process (RO- or UF-process) for concentrating and/or purifying liquids or separating components dissolved in these liquids comprises disposing on one side of the semipermeable membrane a solution with a solute, and applying a hydraulic pressure to said solution and said membrane, said pressure being greater than the osmotic pressure of said solution:

1. The separation of organic and metal-organic ionic substances from by-products from a reaction mixture and other substance which are contained therein, for example from salts, such as sodium chloride, sodium sulfate, sodium acetate or acids.

2. The purification of effluents which are obtained from the production and use of dyes and fluorescent brighteners.

3. The separation of ionic molecules (salts from aqueous solution, i.e. the concentration of aqueous solutions which contain metal complexes, surfactants, dyes or proteins; the results obtained in this case being better, with regard to the efficiency (permeability (flux) per unit time) and the separating effect, than those obtained with known membranes).

The separation effect (the rejection) of the membranes can be measured as follows: a circular membrane with a surface area of 13 cm², resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to pressure of 14 bars. The solution is stirred magnetically. The liquid which collects on the outlet side of the membrane is examined to determine its content (concentration) $c_2$ of the substance to be tested, 3 samples of 5 ml each being taken from the start of the experiment. In general, the amount which flows through the membrane and the composition of the 3 samples are constant. The rejection can be calculated from the values obtained, using the equation:

$$R = \frac{c_1 - c_2}{c_1} \cdot 100\%$$

The amount of the material passed through the membrane per surface and time unit is found to be:

$$F = V \cdot S^{-1} \cdot t^{-1}$$

V: volume
S: membrane surface area
t: time

F is approximately expressed in $m^3.m^{-2}.d^{-1}$, i.e. the number of cubic meters per square meter surface area of the membrane and per day, or in $1 \ m^{-1}$, i.e. liters per square meter surface area of the membrane per hour.

In addition to the measurements on flat membranes, measurements on tubular membranes 60 cm long and with an outer diameter of 1.4 cm are also carried out. For this purpose, these tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent or laminar flow, under pressure (30 bars). The flow rate is kept constant at 10–15 liters per minute. The rejection (R) and the flux (F) are calculated in the same way as for the flat membranes.

In the following examples, the dyes and colourless compounds of formulae (101 to 105) are used as reactive agents for crosslinking and charging the adsorbed polymer layer, while the dyes of formulae (106) and (107) are used in test solutions.

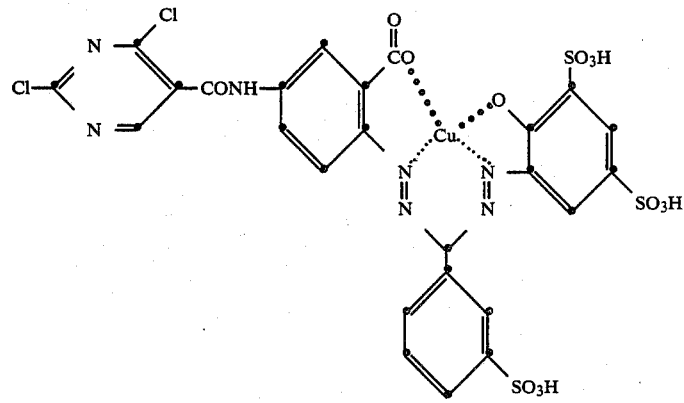

(101)

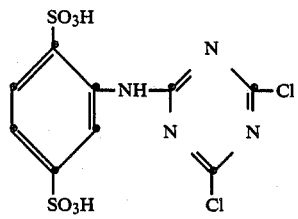

(102)

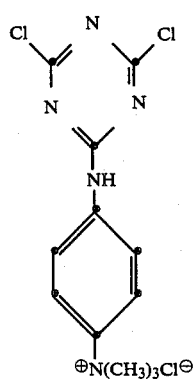

(103a)

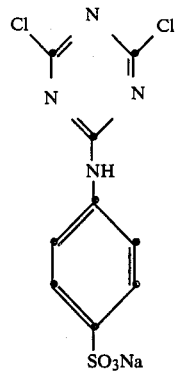 (103b)

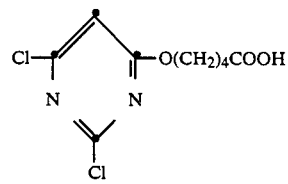 (104)

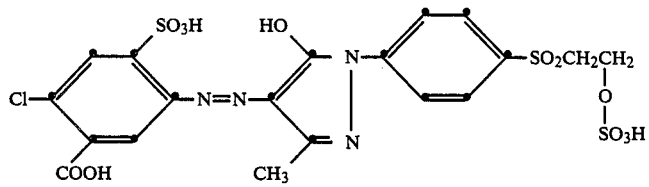 (105)

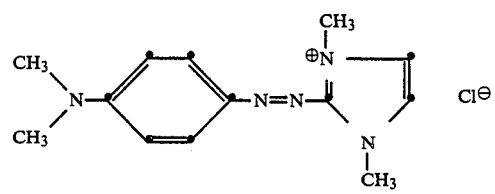 (106)

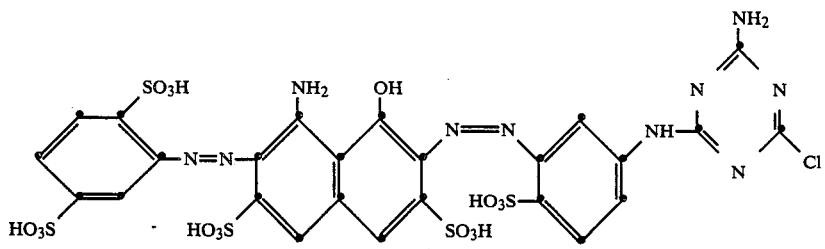 (107)

EXAMPLE 1

A polysulfone membrane made from a polymer of the structure

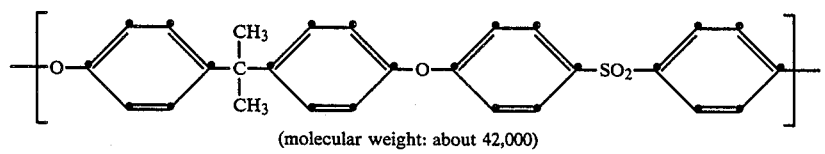

(molecular weight: about 42,000)

and having a flux/rejection profile for various solutes as described in Table 1, is modified by the following procedure of steps (a) through (k).

Procedure (a) The membrane is immersed in polyethyleneimine (PEI) (average MW 30,000) (5%), pH 8.5 for 10 minutes; (b) washed for 2 hours with water (c) immersed in a 0°–4° C. 2% aqueous suspension of cyanuric chloride for 10 minutes; (d) washed for 10 minutes with ice water; (e) immersed in an aqueous 10% solution of PEI, pH 8.5 for 5 minutes; (f) washed for 2 hours; (g) then placed in a bath containing the reactive dye of formula (101) (1%), and NaCl (10%) for 15 minutes; (h) drip for 10 seconds, and (i) immersed in a 2% $Na_2CO_3$ bath for 30 minutes at room temperature; (j) washed for 10 minutes with tap water, and (k) then placed in a bath of cyanuric chloride as described above in (c) for 5 minutes. The performance of the modified membrane is given in Table 1.

TABLE 1

| Solute | Solute concentration % | Before Modification Rejection % | Before Modification Flux l/m²·h | After Modification Rejection % | After Modification Flux l/m²·h |
|---|---|---|---|---|---|
| Dye of formula (107) | 1.5 | 69 | 260 | 99.64 | 96 |
| Dye of formula (106) | 2.0 | 50 | 75 | 98 | 33 |
| Congo Red | 1.0 | 45 | 184 | 99.1 | 86 |

TABLE 1-continued

| Solute | Solute concentration % | Before Modification Rejection % | Before Modification Flux l/m²·h | After Modification Rejection % | After Modification Flux l/m²·h |
|---|---|---|---|---|---|
| Toluene Sulfonic acid | 1.0 | 2.1 | 142 | 18 | 114 |
| NaCl | 1.0 | 0 | 270 | 6.9 | 152 |

Testing conditions: pH-value 7.0; 25° C.; 20 bar; flat sheets

Stability test:

A tubular form of the above modified membrane is tested at pH 10, 50° C. and 20 bar and gives an initial performance of 99% rejection and 1800 l/m².d for a 4% solution of the dye formula (107). After 2000 hours of continuous operation the rejection and flux are 99.6% and 1300 l/m².d.

EXAMPLE 2

A membrane similar to example 1, but with a rejection to the dye of formula (107) of 91% instead of 69%, is modified via the sequence of steps (a), (b), (g), (h), (i), (j), and (k). The modified membrane shows a flux and rejection to dye of formula (107) (5%, 20 bar, pH 7.0) of 99.6% and 110 l/m².h. A tubular membrane made of the same polymeric material and modified in the same way, shows a rejection and flux for a waste water containing a considerable amount of organic carbon of 93% and 1100 l/m².d at 55° C., pH 10 and 20 bar.

EXAMPLE 3

A polysulfone membrane with repeating units of the formula

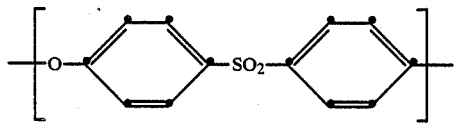

is modified according to the procedure of example 1. The rejection and flux of the unmodified and modified membranes to the dye of formula (107) (5%) at 20 bar in a flat test cell is 82%, 150 l/m².d and 99.1% and 88 l/m².d, respectively.

EXAMPLE 4

Example 3 is repeated using 10% solutions of different coating polymers other than PEI. These are:

(I) Polyvinylamine.HCl (MW 50,000)

(II) Poly(vinylamine/vinylsulfonate) (80/20) (MW 40,000)

(III) Polyvinylalcohol (MW 20,000)

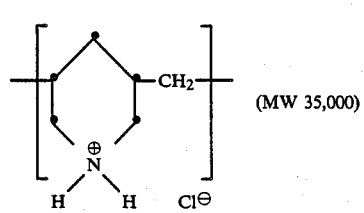

(IV)

(MW 35,000)

The results are given in Table 2.

TABLE 2

| Coating polymer | Rejection % | Flux l/m²·h |
|---|---|---|
| I | 98.9 | 75 |
| II | 99.0 | 102 |
| III | 98.0 | 56 |
| IV | 99.2 | 68 |

Testing conditions: 20 bar; 1.5% of dye of formula (107); 25° C. (R.T.)

EXAMPLE 5

Example 1 is repeated, with the exception that 1% PEI is used in step (e) instead of 10%, and a UF membrane made from polyacrylonitrile instead of polysulfone having the following flux/rejection properties before (Table 3) and after (Table 4) modification:

TABLE 3

Polyacrylonitrile UF Membrane before Modification.

| Solute | Test conditions | Flux l/m²·h | Rejection % |
|---|---|---|---|
| Dye of formula (107) | 0.5%, 20 bar, R.T. | 296 | 81 |
| Toluene sulfonic acid | 2%, 20 bar, R.T. | 640 | 1.7 |
| NaCl, 2% | 2%, 20 bar, R.T. | 320 | 1.6 |

Membrane performance after modification is given in Table 4.

TABLE 4

Polyacrylonitrile-UF Membrane after Modification.

| Solute | Flux l/m²·h | Rejection % |
|---|---|---|
| Dye of formula (107), 1.5% | 70 | 99.6 |
| Toluene sulfonic acid, 2% | 53 | 48 |
| NaCl | 76 | 11 |

Test conditions: as in example 1.

EXAMPLE 6

The modification sequence of example 2 is repeated using the polyacrylonitrile membrane as in example 5. The results are given in Table 5.

TABLE 5

| Solute | Flux l/m²·h | Rejection % |
|---|---|---|
| Dye of formula (107), (1.5%) | 83 | 99.8 |
| Toluene sulfonic acid, (2%) | 104 | 16 |
| NaCl, (2%) | 120 | 4 |

Test condition: as in example 1.

EXAMPLE 7

Example 5 is repeated, with the exception that the step of reaction with the charged multifunctional compound (dye of formula (101)) is left out. The resultant membrane has a rejection to toluene sulfonic acid of only 1.5% instead of 48% as in example 5. If, instead of dye of formula (101), a charged multifunctional compound of formulae (102), (103), (104) or (105) is used, good results are also achieved (Table 6).

TABLE 6

| Charging agent of formula | Flux l/m²·h | Rejection % |
|---|---|---|
| (102) | 89 | 99.2 |
| (103) | 45 | 98.1 |
| (104) | 62 | 99.9 |
| (105) | 110 | 98.9 |

Test conditions: 1.5% test solute of dyestuff of formula (107); 20 bar; pH 7.0; 40° C.

EXAMPLE 8

The modification procedure of example 1 is repeated using, instead of polysulfone, polyvinylidene fluoride of structure

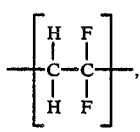

molecular weight 100,000.

The unmodified membrane has a rejection to solute of formula (107) of 86%, after modification the rejection is 99.8%.

EXAMPLE 9

An unmodified membrane according to example 2 is modified by immersing the membrane for 10 minutes in a 10% aqueous bath of poly(vinylamine-vinyl sulfonate-Na salt) (60/40) (MW 10,000–50,000), rinsed for 15 minutes, immersed in a 2% cyanuric chloride solution of pH 10 for 5 minutes. The resulting membrane had a flux and rejection to test solute of formula (107) of 2000 l/m².d and 99.91%, and a rejection to 4,4'-dinitrostilbene-2,2'-disulfonic acid (2% solution) of 93% at 1200 l/m².d.

EXAMPLE 10

Example 9 is repeated, with the difference that after the cyanuric chloride step the membrane is washed for 10 minutes in ice water and the first three steps of immersion in poly(vinylamine-vinyl sulfonate-Na salt), rinsing 15 minutes and crosslinking with cyanuric chloride are repeated. The rejection to an aqueous solution of waste containing 4,4'-dinitrostilbene-2,2'-di-sulfonic acid (2%, pH of above 10) increased to 96% with a flux of 700 l/m².d. To demonstrate the desalting and separation efficiency between a low molecular weight solute and sodium chloride, the above membrane is tested with a mixture of a synthetic waste stream containing 100 ppm of the compound of formula

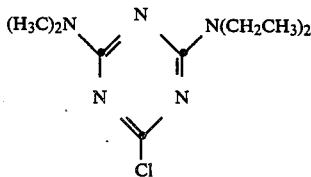

and 10% NaCl.

At 40 bar pressure the rejection of the organic compound and NaCl are 88% and 9% respectively, with a flux of 800 l/m².d.

The same membrane is then used to concentrate a test solution of the same (100 ppm) compound containing 2.5M NaCl. The results: After a 5-fold concentration the mass balance rejection of 87% indicates an average rejection to the organic solute of 90%. The mass balance salt rejection is less than 5% and the fluxes remain at a level of 740–780 l/m².d (mass-balance: total amount of permeated solute abstracted from total amount of feed).

EXAMPLE 11

Example 2 is repeated with twice the sequence of steps (a), (b), (g), (h), (i), (j) and (k), wherein the PEI concentration in both sequences is 1.0%, instead of a washing step (b) a draining step of 5 minutes is used, and in steps (k) 0.1% cyanuric chloride is used instead of 2%. The resultant membrane has a rejection and flux to separate test solutes of dye of formula (107) (5%), 4,4'-dinitrostilbene-2,2'-disulfonic acid (2%) (DNS), and sodium chloride (NaCl) (1%) of 99.9%/850 l/m².d, 97.5%/1760 l/m².d and 12%/2700 NaCl l/m².d, respectively at room temperature, 20 bar and pH 7. When the NaCl is contained in the other two solutes its rejection is negative (i.e. the permeate contains a higher concentration of NaCl than the feed).

Similar results are achieved with the PEI solution is varied from 0.25 to 1%, and if the draining step (b) is a washing or immersion step (in tap water) of up to 120 minutes.

EXAMPLE 12

Example 11 is repeated with the difference that the reactive dye of formula (101) is replaced with the non-coloured reactive intermediate of formula (103b) in steps (g) (steps (i) are not carried out), at a concentration of 0.5% in water, ambient conditions, at pH 7.0 and the membrane is immersed for 20 minutes in this solution. The rejection and flux to test solute of dye of formula (107) (5%), sucrose (1%), DNS (2%) and NaCl (1%) are 99.4%/160 l/m².d, 94%/1320 l/m².d, 98%/1960 l/m².d and 5%/160 l/m².d at 25 bar, pH of 7 and room temperature, respectively.

EXAMPLE 13

This example shows the possibility of replacing both the reactive dye and non-ionic crosslinking reagent with a colourless ionic crosslinking reagent (multifunctional reagent). A starting membrane of example 2 is immersed in a 1% PEI bath at pH 8.5 for 10 minutes, washed for 30 minutes with tap water and placed in a 0.1% solution of the multifunctional reagent of formula (103b) at room temperature, pH 7.0 for 30 minutes. After washing for 30 minutes, the same PEI step and crosslinking step with the reagent of formula (103b) are repeated in the same sequence. The resultant membrane gives a rejection and flux to test solute of dye of formula (107) (5%) and DNS (2%) of 99.9%/940 l/m².d and 98.5%/800 l/m².d. If only one coating of the polymer and the reagent of formula (103b) is used, then the rejection and flux to test solute of dye of formula (107) (5%) is 98.6% and 2100 l/m².d, respectively (20 bar, room temperature, pH 7).

EXAMPLE 14

This example demonstrates the formation of amphoteric or mixed charged encapsulations. Example 13 with two coatings of PEI is repeated within the first layer is crosslinked with the multifunction reagent of the formula (103b) under the same conditions as above, and the second coating is crosslinked with the multifunctional reagent of the formula (103a) containing cationic reactive groups, under identical conditions and concentration as with the reagent of formula (103b). The results are given in Table 7.

EXAMPLE 15

Example 14 is repeated wherein the reagent of formula (103a) is applied first and the reagent of formula (103b) is applied after the second coating. The results are given in Table 7.

EXAMPLE 16

Example 14 is repeated wherein both multifunctional reagents of formulae (103a) and (103b) are applied simultaneously under the same conditions of time, temperature, pH and concentration (0.1% each).

The results are given in Table 7.

TABLE 7

| Membrane (Example) | Dye of formula (107) (5%) | | DNS (2%) | | NaCl (1%) | |
| --- | --- | --- | --- | --- | --- | --- |
|  | Rejection % | Flux l/m²·h | Rejection % | Flux l/m²·h | Rejection % | Flux l/m²·h |
| 14 | 99.8 | 1520 | 94.2 | 1696 | 4.0 | 3200 |
| 15 | 98.4 | 2460 | 96 | 1243 | 1.0 | 2451 |
| 16 | 99.2 | 845 | 95 | 2383 | −2.0 | 1129 |

Test conditions as in Example 13.

EXAMPLE 17

Example 11 is repeated wherein instead of PEI the condensation products of dicyandiamide, ammonium chloride and formaldehyde (U.S. Pat. No. 3,290,310) is used at the same conditions. The resultant membranes has a rejection and flux to test solute of the formula (107) (1.5%), DNS (2%), NaCl (1%) and sucrose (2%) of 99.6%/749 l/m².d, 98%/1624 l/m².d, 4.6%/1294 l/m².d and 89%/943 l/m².d.

EXAMPLE 18

Example 11 is repeated wherein the PEI is replaced with a hydroxyethylated PEI (MW 60-80 000) under the same conditions of pH, temperature and concentration. The resultant membrane has a rejection and flux to a 5% solution of test solute of the formula (107) under turbulent flow conditions at 50° C. and a pH of 10 of 99.99% and 2149 l/m².d, respectively.

EXAMPLE 19

Example 2 is repeated wherein instead of cyanuric chloride a 1% dispersion of butane-1,4-dioldiglycidylether, at pH 8 and room temperature is used, after which the membrane is immersed in an aqueous alkaline solution (pH 10) for 12 hours prior to testing. The results are given in Table 8.

EXAMPLE 20

Example 19 is repeated using instead of the diepoxide a polyamido polyamine epichlorohydrin cationic resin (1% solution, pH 4.5, room temperature 10 minutes) with repeating units of the structure

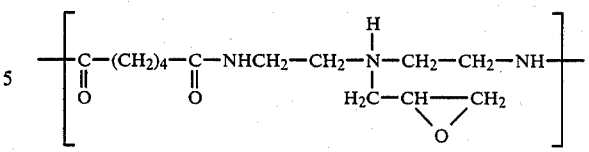

The results are given in Table 8.

EXAMPLE 21

Example 19 is repeated using a cationic resin with repeating units of the formula

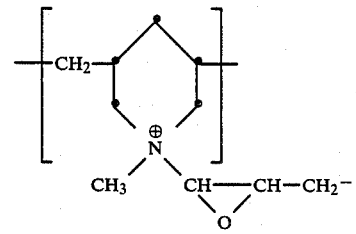

The results are given in Table 8.

TABLE 8

| | Test solutes | | | | | |
| --- | --- | --- | --- | --- | --- | --- |
| Membrane Example | Dyestuff of formula (107) (1.5%) | | DNS (2%) | | NaCl (1%) | |
| | Rejection (%) | Flux l/m²·h | Rejection (%) | Flux l/m²·h | Rejection (%) | Flux l/m²·h |
| 19 | 99.8 | 597 | 99 | 1306 | 23 | 1481 |
| 20 | 99.9 | 443 | 98.6 | 1344 | 18.8 | 1493 |
| 21 | 99.9 | 1260 | 99.2 | 1842 | 6.4 | 2600 |

Test conditions: 20 bar, pH 7, room temperature

We claim:

1. An encapsulated semipermeable membrane constructed for ultrafiltration and reverse osmosis, comprising a polymeric substrate and a thin semipermeable film obtained by coating onto the external surface and all accessible internal surfaces of the substrate at least one layer of a cross-linkable hydrophilic polymer, and cross-linking the layer with a polyfunctional compound containing at least two functional groups.

2. A membrane according to claim 1, wherein the substrate is pretreated with a polyfunctional compound containing at least two functional groups.

3. A membrane according to claim 1, wherein the thin semipermeable film is prepared by
   (a) depositing at least one layer of a cross-linkable hydrophilic non-ionic polymer onto the substrate, and
   (b) cross-linking the layer with at least one polyfunctional compound containing at least two functional groups, at least one of the polyfunctional compounds containing ionic groups.

4. A membrane according to claim 3, wherein the layer of the cross-linkable hydrophilic non-ionic polymer is cross-linked with non-ionic and ionic polyfunctional compounds containing at least two functional groups.

5. A membrane according to claim 3, wherein the layer of the cross-linkable hydrophilic non-ionic polymer is cross-linked in either order with an ionic and a non-ionic polyfunctional compound.

6. A membrane according to claim 3, wherein the layer of the cross-linkable hydrophilic non-ionic polymer is cross-linked with two different ionic, polyfunctional compounds having the same or opposite charges.

7. A membrane according to claim 6, wherein the layer is additionally cross-linked with a non-ionic polyfunctional compound.

8. A membrane according to claim 1, wherein the thin semipermeable film is prepared by
(a) depositing at least one layer of a cross-linkable hydrophilic, ionic groups containing polymer onto the substrate, and
(b) cross-linking the layer with at least one polyfunctional compound containing at least two functional groups.

9. A membrane according to claim 8 wherein the layer of the cross-linkable hydrophilic, ionic groups containing polymer is cross-linked with polyfunctional compounds selected from the group consisting of non-ionics, ionics and mixtures of both.

10. A membrane according to claim 8, wherein the layer of the cross-linkable, hydrophilic, ionic-groups containing polymer is cross-linked with an ionic polyfunctional compound whose charges are opposite to those of the ionic groups of the polymer.

11. A membrane according to claim 8 wherein the cross-linkable, hydrophilic polymer is an amphoteric one cross-linked with an anionic polyfunctional compound.

12. A membrane according to claim 1, wherein the thin semipermeable film is prepared by
(a) treating the substrate with a polyfunctional compound containing at least two functional groups,
(b) depositing at least one layer of a cross-linkable hydrophilic polymer onto the substrate, and
(c) cross-linking it with at least two polyfunctional compounds containing at least two functional groups.

13. A membrane according to claim 12, wherein the substrate is treated with ionic or non-ionic polyfunctional compounds, then a cross-linkable, hydrophilic polymer is deposited onto the substrate and cross-linked in either order with anionic or non-ionic polyfunctional compound containing at least two functional groups.

14. A membrane according to claim 1, wherein two or three layers of the cross-linkable, hydrophilic polymer are deposited onto the substrate and each layer is cross-linked with at least one polyfunctional compound containing at least two functional groups.

15. A membrane according to claim 14, wherein two layers of the cross-linkable, hydrophilic polymer are deposited onto the substrate and each layer is cross-linked with at least one polyfunctional compound selected from the group consisting of ionics, non-ionics and mixtures of both.

16. A membrane according to claim 1, wherein the substrate comprises at least one member of the group consisting of cellulosics, polyacrylonitriles, aromatic polysulfones, polyamides, polyvinylidene fluorides and polytetrafluoroethylenes.

17. A membrane according to claim 1, wherein the cross-linkable hydrophilic polymer contains active hydrogen atoms bonded to nitrogen, oxygen or sulfur atoms.

18. A membrane according to claim 17, wherein the cross-linkable, hydrophilic polymer comprises homo- or copolymers of at least one member of the group consisting of polyethyleneimines, polyvinylalcohols, cellulose derivatives, polyvinylamines, polyvinylanilines, polypiperidines, polydiallylamines, amino modified epoxides and amino modified polyepihalohydrines, or amphoteric polymers with reactive hydrogen atoms bonded to nitrogen, oxygen or sulfur atoms.

19. A membrane according to claim 1, wherein the polyfunctional compounds contain at least two functional groups selected from the group consisting of multiple unsaturated bonds, epoxide, aziridine, aldehyde, imidate, isocyanate, isothiocyanate, hydroxyl, carboxylic acid, carboxylic anhydride, carboxylic halide, cyclic carbonic acid imide halide moieties, detachable tertiary amine, and detachable anions.

20. A membrane according to claim 19, wherein the polyfunctional compounds are non-ionic and selected from the group consisting of cyclic carbonic acid imide halides, and compounds containing epoxide groups.

21. A membrane according to claim 20, wherein the non-ionic polyfunctional compounds are selected from the group consisting of halogenodiazines, triazines, and epoxides containing at least two functional substituents.

22. A membrane according to claim 19, wherein the polyfunctional compounds are ionic and selected from the group consisting of colorless halotriazines and halopyrimidines.

23. A membrane according to claim 19, wherein the polyfunctional compounds are ionic reactive azo containing ionic groups selected from the group consisting of sulfonic acid groups, carboxylic acid groups, ammonium groups, and mixtures thereof.

24. A membrane according to claim 23, wherein the polyfunctional compound is a reactive azo dyestuff containing ionic groups selected from the groups consisting of sulfonic acid (—SO$_3$H) and carboxylic (—COOH) groups and reactive groups selected from the group consisting of monochlorotriazinyl, dichlorotriazinyl, 2,4-dichloropyrimidinyl, vinyl sulfonyl, β-sulfatoethylsulfonyl, β-chloroethylsulfonyl, and β-sulfatoethylaminosulfonyl.

25. A process for the manufacture of an encapsulated semipermeable membrane according to claim 1, which comprises depositing onto a semipermeable polymeric substrate from an aqueous system at least one layer of a cross-linkable, hydrophilic polymer, and cross-linking the layer by penetrating it with an aqueous preparation of at least one polyfunctional compound containing at least two functional groups.

26. A process according to claim 25, which comprises depositing the polymer on a substrate being pretreated with a polyfunctional compound containing at least two functional groups.

27. A process according to claim 25, which comprises depositing onto the substrate at least one layer of a cross-linkable, hydrophilic, non-ionic polymer and cross-linking the layer with at least one polyfunctional compound containing at least two functional groups, at least one of the polyfunctional compounds containing ionic groups.

28. A process according to claim 27, which comprises depositing onto the substrate an aqueous solution containing 0.1 to 80% by weight of the cross-linkable hydrophilic polymer, and cross-linking the polymer with an ionic and a non-ionic polyfunctional compound each containing at least two functional groups.

29. A process according to claim 25, which comprises depositing onto the substrate at least one layer of a cross-linkable, hydrophilic, ionic groups containing polymer and cross-linking the layer with at least one polyfunctional compound containing at least two functional groups.

30. A process according to claim 29, which comprises depositing onto the substrate an aqueous solution containing 0.1 to 80% by weight of a cross-linkable hydrophilic polymer, containing ionic groups, and cross-linking the polymer with a non-ionic polyfunctional compound containing at least two functional groups.

31. A process according to claim 25, which comprises treating the substrate with a polyfunctional compound containing at least two functional groups, depositing onto said substrate a cross-linkable hydrophilic polymer and cross-linking the layer with a polyfunctional compound containing at least two functional groups.

32. A process according to claim 31, which comprises treating the substrate with an aqueous solution of a polyfunctional compound, containing at least two functional groups, depositing an aqueous solution containing 0.1 to 80% by weight of the cross-linkable, hydrophilic polymer which is then cross-linked with a polyfunctional compound each containing at least two functional groups.

33. A process according to claim 25, which comprises depositing onto the substrate an aqueous solution containing 0.1 to 80% by weight of the cross-linkable, hydrophilic polymer, cross-linking the polymer with at least one polyfunctional compound containing at least two functional groups and repeating these two steps once or twice.

34. A process according to claim 25, wherein the polyfunctional compounds containing at least two functional groups are applied from aqueous solutions containing 0.05 to 5% by weight of these compounds.

35. A reverse osmosis/ultrafiltration process for treating aqueous solutions of solutes of different chemical species having a certain osmostic pressure comprising the steps of:
(a) disposing the aqueous solution on one side of the membrane of claim 1,
(b) filtering said solution through said membrane by applying a hydraulic pressure to the aqueous solution greater than its osmotic pressure, and
(c) collecting the resulting permeate and impermeate fractions from the two sides of said membrane.

* * * * *